(12) United States Patent
Curtis et al.

(10) Patent No.: US 7,006,954 B1
(45) Date of Patent: Feb. 28, 2006

(54) RANDOM SAMPLING FOR MULTIVARIATE BERNOULLI VARIABLES

(75) Inventors: Wendell Curtis, Redmond, WA (US); Karel Zikan, Seattle, WA (US); Henry Sowizral, Bellevue, WA (US)

(73) Assignee: Terabeam Corporation, Falls Church, VA (US)

( * ) Notice: Subject to any disclaimer, the term of this patent is extended or adjusted under 35 U.S.C. 154(b) by 763 days.

(21) Appl. No.: 10/077,343

(22) Filed: Feb. 15, 2002

(51) Int. Cl.
*G06F 17/10* (2006.01)

(52) U.S. Cl. .......................................... 703/2
(58) Field of Classification Search .................. 703/2
See application file for complete search history.

(56) References Cited

U.S. PATENT DOCUMENTS 6,581,058 B1 * 6/2003 Fayyad et al. ................. 707/6

* cited by examiner

*Primary Examiner*—Hugh Jones
(74) *Attorney, Agent, or Firm*—Blakely Sokoloff Taylor & Zafman LLP

(57) ABSTRACT

One embodiment of the present invention generates random samples for a Bernoulli distribution. A first covariance matrix is generated using a desired mean vector and a desired covariance matrix of the Bernoulli distribution. A normal vector is constructed using the desired mean vector and the first covariance matrix. A sampling vector is generated using the normal vector and a threshold vector. The sampling vector has the desired mean vector and the desired covariance matrix.

40 Claims, 5 Drawing Sheets

RANDOM SAMPLING FOR MULTIVARIATE BERNOULLI VARIABLES

BACKGROUND

1. Field of the Invention

This invention relates to networks. In particular, the invention relates to network reliability.

2. Description of Related Art

In certain studies of reliability of computer networks, it is useful to be able to generate samples of a Bernoulli random vector whose components model the current state of some network element. For example, the individual Bernoulli variables may correspond to the links in the network, with a value of 1 indicating the link is functional or "up", and a value of 0 indicating it is non-functional or "down".

Existing work on network reliability usually assumes that the Bernoulli variables corresponding to the links are independent. This assumption means that the random samples can be obtained independently for the individual components. Under this assumption, if the probability of each link being up or down is specified, then the sampling problem is trivial. However, the independence assumption is not realistic for certain types of networks, such as those using free-space optical (FSO) links. In these networks, there are common factors that affect the states of the links. For example, weather conditions may affect links within a locality. If a particular FSO link is down due to heavy fog, then it is likely that nearby links are down as well. The states of the links in these types of networks are, therefore, correlated and/or dependent on each other. To characterize this correlation, a covariance matrix is used in addition to the means of the link variables. The necessity of providing a covariance matrix for a Bernoulli variables makes it difficult to generate random samples of the network state.

In addition, the computational requirements for the joint probability density of such random vector are enormous. This is because such a joint density is a discrete density having $2^n$ components where n is the length of the random vector. For a vector of even moderate length, the number of components making up the discrete density is extremely large, over 1 billion for n=30.

Therefore, there is a need to have an efficient technique to generate a random vector for multivariate Bernoulli variables.

BRIEF DESCRIPTION OF THE DRAWINGS

The features and advantages of the present invention will become apparent from the following detailed description of the present invention in which.

DESCRIPTION

One embodiment of the present invention generates random samples for a Bernoulli distribution. A first covariance matrix is generated using a desired mean vector and a desired covariance matrix of the Bernoulli distribution. A normal vector is constructed using the desired mean vector and the first covariance matrix. A sampling vector is generated using the normal vector and a threshold vector. The sampling vector has the desired mean vector and the desired covariance matrix.

In the following description, for purposes of explanation, numerous details are set forth in order to provide a thorough understanding of the present invention. However, it will be apparent to one skilled in the art that these specific details are not required in order to practice the present invention. In other instances, well-known electrical structures and circuits are shown in block diagram form in order not to obscure the present invention.

Figure 1:
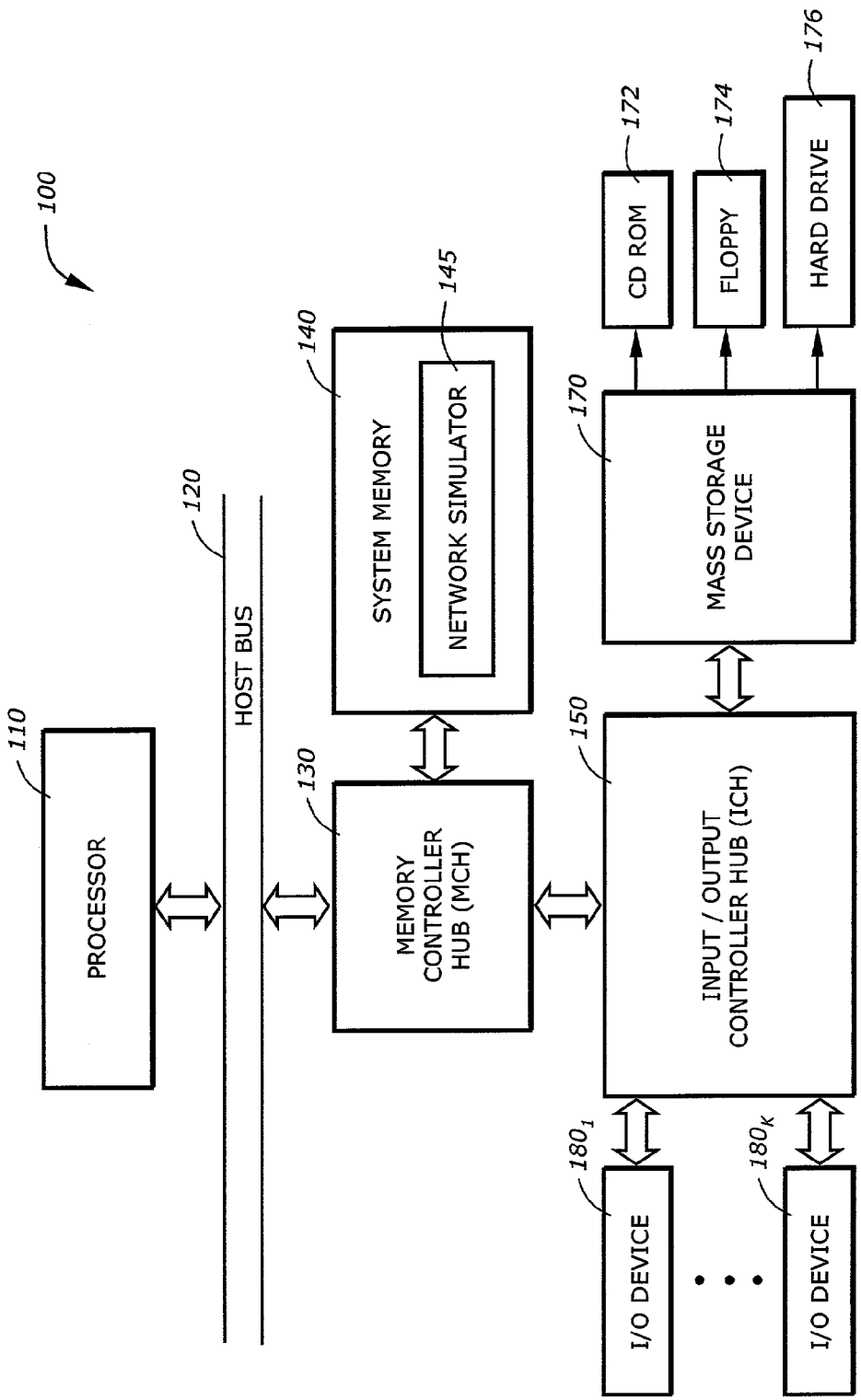
FIG. 1 is a diagram illustrating a system in which one embodiment of the invention can be practiced.

FIG. 1 is a diagram illustrating a computer system 100 in which one embodiment of the invention can be practiced. The computer system 100 includes a processor 110, a host bus 120, a memory control hub (MCH) 130, a system memory 140, an input/output control hub (ICH) 150, a mass storage device 170, and input/output devices $180_1$ to $180_K$.

The processor 110 represents a central processing unit of any type of architecture such sa embedded processors, micro-controllers, digital signal processors, superscalar computers, vector processors, single instruction multiple data (SIMD computers, complex instruction set computers (CIS), reduced instruction set computers (RISC), very long instruction word (VLIW), or hybrid architecture. The host bus 120 provides interface signals to allow the processor 110 to communicate with other processors or devices, e.g., the MCH 130. The host bus 120 may support a uni-processor or multiprocessor configuration. The host bus 120 may be parallel, sequential, pipelined, asynchronous, synchronous, or any combination thereof.

The MCH 130 provides control and configuration of memory and input/output devices such as the system memory 140 and the ICH 150. The MCH 130 may be integrated into a chipset that integrates multiple functionalities such as the isolated execution mode, host-to-peripheral bus interface, memory control. For clarity, not all the peripheral buses are shown. It is contemplated that the system 100 may also include peripheral buses such as Peripheral Component Interconnect (PCI), accelerated graphics port (AGP), Industry Standard Architecture (ISA) bus, and Universal Serial Bus (USB), etc.

The system memory 140 stores system code and data. The system memory 140 is typically implemented with dynamic random access memory (DRAM) or static random access memory (SRAM). The system memory may include program code or code segments implementing one embodiment of the invention. The system memory includes a network simulator 145. The network simulator 145 may also be implemented by hardware, software, firmware, microcode, or any combination thereof. The system memory 140 may also include other programs or data which are not shown, such as an operating system.

The ICH 150 has a number of functionalities that are desired to support I/O functions. The ICH 150 may also be integrated into a chipset together or separate from the MCH 130 to perform I/O functions. The ICH 150 may include a number of interface and I/O functions such as PCI bus interface, processor interface, interrupt controller, direct memory access (DMA) controller, power management logic, timer, universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, floppy diskettes 174, and hard drive 176, and any other magnetic or optic storage devices. The mass storage device 170 provides a mechanism to read machine-readable media.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

The present invention may be implemented by hardware, software, firmware, microcode, or any combination thereof. When implemented in software, firmware, or microcode, the elements of the present invention are the program code or code segments to perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc. The program or code segments may be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

It is noted that the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a function, a procedure, a subroutine, a subprogram, etc. When a process corresponds to a function, its termination corresponds to a return of the function to the calling function or the main function.

Figure 2:
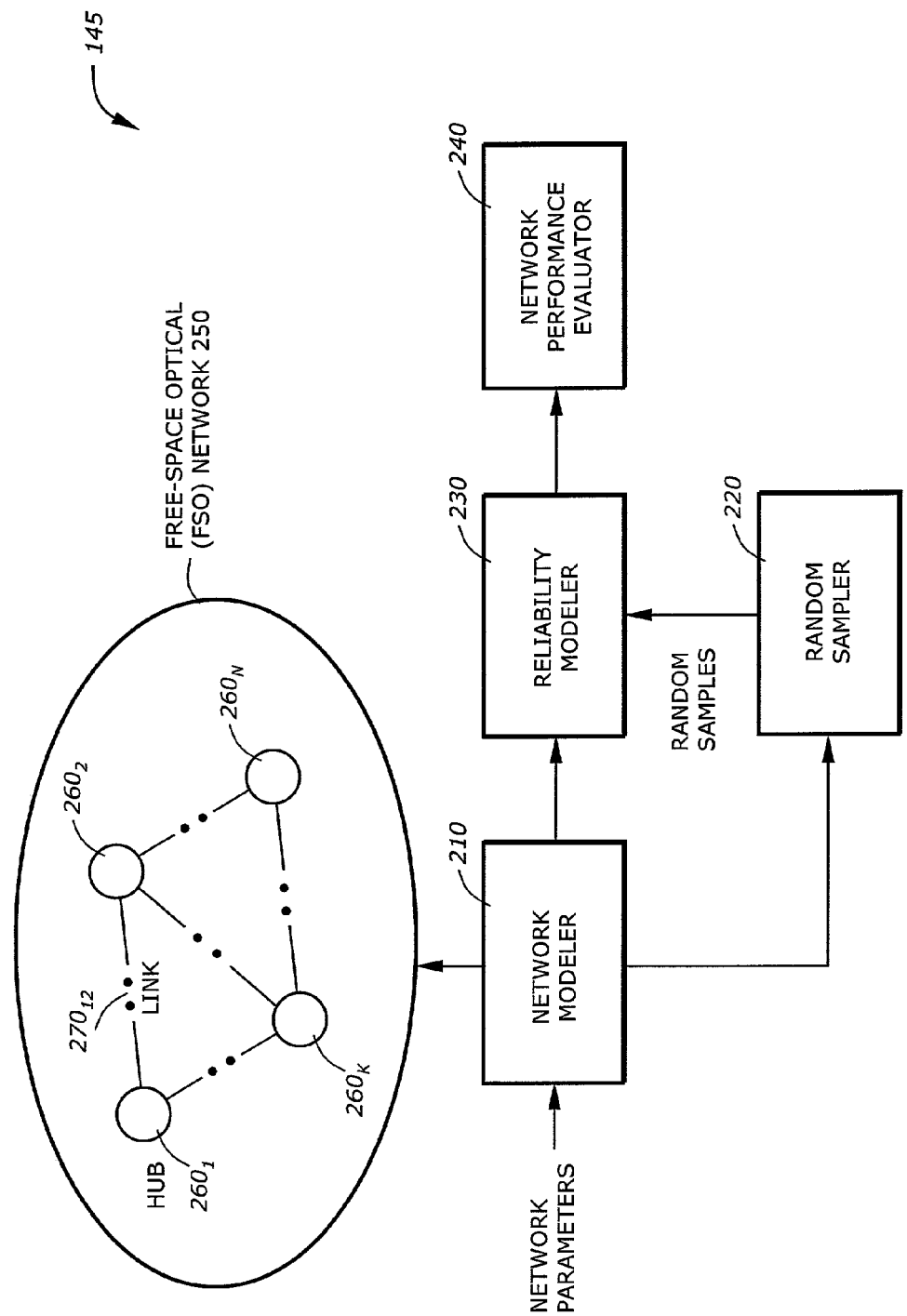
FIG. 2 is a diagram illustrating a simulator shown in FIG. 1 according to one embodiment of the invention.

FIG. 2 is a diagram illustrating the simulator 145 shown in FIG. 1 according to one embodiment of the invention. The simulator 145 includes a network modeler 210, a random sampler 220, a reliability modeler 230, and a network performance evaluator 240. The simulator 145 may be implemented by software, hardware, or any combination thereof. Each of the network modeler 210, the random sampler 220, the reliability modeler 230, and the network performance evaluator 240 may be a software module, a function, a subprogram, a method, or a hardware element, or any combination of hardware and software.

The network modeler 210 creates a model for the network whose reliability is to be studied. The network modeler 210 receives the network parameters such as number of hubs, number of links, weather conditions, etc. The network model generated by the network modeler 210 may be any type of network and network configuration. In one embodiment, the network is a FSO network. An example of this network is a FSO network 250. The network 250 may be located in a metropolitan area. In the FSO network 250, hubs are connected via fiberless optical links. At a transmitter at a hub, electrical signal representing the data or information is converted into a beam of light by a laser or optical transmitter. The light is then sent through a lens that increases its divergence. This wide beam of light is then sent through the air to the receiving unit at the other hub. As the light enters the receiver, it goes through several lenses and is focused on a small detector. The detector then converts the light back into electrical signals for the network equipment to use.

In the network 250, there are N hubs $260_1$ to $260_N$. A hub is connected to another hub through an optical link. A hub may have one or more transmitters and/or receivers so that it can transmit to or receive from multiple hubs. A hub $260_k$ s connected to a hub $260_j$ via a link $270_{kj}$. For example, hub $260_1$ and $260_2$ is connected by optical link $270_{12}$. There are M optical links $270_1$ to $270_M$. Since these links exist within a locality of a metropolitan area through the air medium, their operational states are highly correlated and dependent. For example, in a sunny day, the optical links are highly operational and their states may be characterized as operational or "up". On the other hand, in a foggy day, these links may become non-operational and their states may be characterized as non-operational or "down".

The random sampler 220 receives the model parameters from the network modeler 210 to generate random samples to the reliability modeler 230. The model parameters may include statistical parameters of the states of the optical links in the network 250. The statistical parameters may include the distribution type, the desired mean, and the desired covariance matrix of the distribution. Since the state of an optical link can assume one of two values: up or down, the distribution may be of a Bernoulli distribution.

The reliability modeler 230 creates a reliability model to study the reliability of the network 250 as modeled by the network modeler 210. The reliability model may be any convenient model including combinatorial models, Markov models, or any other probability models. The reliability model 230 receives the random samples from the random sampler 220 and the network information from the network modeler 210 to apply to the reliability model.

The network performance evaluator 240 evaluates the network performance based on the reliability as provided by the reliability modeler. The network performance evaluator 240 may provide useful information regarding network behavior so that appropriate network configuration may be employed for a wide range of network conditions.

The random sampler 220, therefore, is an important component of the simulator 145 to provide realistic information regarding the conditions of the network 250 so that its reliability may be accurately predicted or evaluated. Since the states of the optical links are correlated and/or dependent, the construction of random samples based on a Bernoulli distribution cannot be performed on an element by element basis.

The random sampler 220 generates the samples to have the desired mean vector $\mu$ and the desired covariance matrix Σ. The procedure to do this is explained in the following. First, the scalar case is considered. The scalar case provides a formula to compute the threshold elements in a threshold vector to be used in the generation of the random samples. Then, the multivariate case is considered.

The scalar case:

Let X be a Bernoulli random variable with mean $\mu$ and variance $\sigma^2$. Then $P(X=1) = \mu$, and $\sigma^2 = \mu(1-\mu)$. Given such an X, let Y be a Gaussian random variable with the same mean and variance. Thus, $Y \sim N(\mu, \sigma^2)$ where N denote the normal distribution. If a threshold $\tau$ is chosen, a new Bernoulli random variable can be defined by the following rule:

$$Z = 1 \text{ iff (if and only if) } Y > \tau, Z = 0 \text{ otherwise} \quad (1)$$

It is desired to choose $\tau$ such that Z has a mean $\mu$ and variance $\sigma^2$. Since $\sigma^2 = \mu(1-\mu)$, it is enough to choose $\tau$ to get the desired mean. Note that Z has mean $\mu$ iff $P(Z=1) = \mu$ which, in turn, is equivalent to $P(Y > \tau) = \mu$. But:

$$P(Y > \tau) = P((Y-\mu)/\sigma) > (\tau-\mu)/\sigma) = \frac{1}{\sqrt{2\pi}} \int_{\frac{\tau-\mu}{\sigma}}^{\infty} e^{-\frac{t^2}{2}} dt \quad (2)$$

Therefore, it is necessary to find $\tau$ so that the integral on the right half side (RHS) is $\mu$. To find the solution, recall that the error function is defined as:

$$erf(z) = \frac{2}{\sqrt{2\pi}} \int_0^z e^{-t^2} dt \quad (3)$$

From this, the expression in (2) may be written as:

$$\frac{1}{\sqrt{2\pi}} \int_y^{\infty} e^{-\frac{t^2}{2}} dt = \frac{1}{2}\left(1 - erf\left(\frac{y}{\sqrt{2}}\right)\right) \quad (4)$$

Using equation (4) and equate (2) to $\mu$, it follows:

$$\frac{1}{2}\left(1 - erf\left(\frac{\tau-\mu}{\sigma\sqrt{2}}\right)\right) = \mu \quad (5)$$

Therefore, the solution is:

$$\tau = \mu + \sigma\sqrt{2} \text{ inverf}(1-2\mu) \quad (6)$$

The multivariate case:

Consider a random vector of Bernoulli variables $X = (X_1, \ldots, X_N)$ having a mean vector $\mu = (\mu_1, \ldots, \mu_N)$ and covariance matrix $\Sigma = (\Sigma_{ij})$, where N is a positive integer denoting the number of links in the network. Note that $\Sigma_{ii} = \mu_i(1-\mu_i)$. A multivariate Gaussian distribution is constructed from the mean vector $\mu$ and the covariance matrix $\Sigma$. Let $Y = (Y_1, \ldots, Y_N)$ be a random vector drawn from this Gaussian or normal distribution. Using equation (6), let $\tau = (\tau_1, \ldots, \tau_N)$ be the threshold vector. A new vector of Bernoulli variables, $Z = (Z_1, \ldots, Z_N)$ is defined by the following rule:

$$Z_i = 1 \text{ iff } Y_i > \tau_i, Z_i = 0 \text{ otherwise} \quad (7)$$

Each Bernoulli variable $Z_i$ has the same mean and variance as the corresponding $X_i$ and $Y_i$. However, generally the covariance matrix of Z is not $\Sigma$. The diagonal elements will be those of $\Sigma$ because $X_i$, $Y_i$, and $Z_i$ have the same variance, but the non-diagonal elements will not be the same. To construct Z to have the desired covariance matrix, another covariance matrix will be generated. This covariance matrix will be used as the basis for the construction of a second normal distribution from which the thresholding rule of (7) can be applied. The procedure to generate this covariance matrix will be explained later.

For now, assuming that this can be done. Observe that the random samples of Z can be obtained by first obtaining samples of Y and then computing the corresponding values of Z. Originally, only the mean vector and the covariance matrix for Z are known, and Z cannot be sampled because the joint densities are not known. By relating to the Gaussian vector Y, the joint density for Z can be known, namely:

$$f_{Z_1, \ldots, Z_N}(1, 0, \ldots, 1) = P(Z_1 = 1, Z_2 = 0, \ldots, Z_N = 1) = P(Y_1 > \tau_1, Y_2 > \tau_2, \ldots, Y_N > \tau_N), \text{ etc.} \quad (8)$$

It is well known that the usual multivariate normal distribution corresponding to $\mu$ and $\Sigma$ is the maximum entropy distribution having the given mean and the given covariance matrix.

Constructing another covariance matrix:

Instead of using the desired covariance matrix $\Sigma$, the procedure starts with construction of a matrix S, chosen in such a way that the covariance matrix of the random vector Z is the desired covariance matrix $\Sigma$. In essence, the procedure is as follows:

Step 1: Write down the expression for the variance of $Z_i$ and $Z_j$ and set it equal to $\Sigma_{ij}$. The expression for the covariance of $Z_i$ and $Z_j$ depends on $\mu_i$, $\mu_j$, and on the non-diagonal elements $s_{ij}$ of the matrix S. Note that the diagonal elements $s_{ii} = \mu_i(1-\mu_i)$.

Step 2: Solve the equation numerically for $s_{ij}$.

Step 3: Repeat steps 1 and 2 for all $i \neq j$, all elements of the covariance matrix S can then be obtained.

To write the equation for $s_{ij}$, note that:

$$cov(Z_i, Z_j) = E(Z_i Z_j) - \mu_i \mu_j \quad (9)$$
$$= P(Z_i = 1 \text{ and } Z_j = 1) - \mu_i \mu_j$$
$$= P(Y_i > \tau_i \text{ and } Y_j > \tau_j) - \mu_i \mu_j$$

It can be written:

$$P(Y_i > \tau_i \text{ and } Y_j > \tau_j) = \quad (10)$$
$$\frac{1}{\alpha} \int_{\tau_i}^{\infty} \int_{\tau_j}^{\infty} \exp\left(-\frac{1}{2(1-\rho^2)}\left(\left(\frac{x-\mu_i}{\sigma_i}\right)^2 - 2\rho\frac{(x-\mu_i)(y-\mu_j)}{\sigma_i \sigma_j} + \left(\frac{y-\mu_j}{\sigma_j}\right)^2\right)\right) dx\, dy$$

where $$\alpha = 2\pi \sigma_i \sigma_j \sqrt{1-\rho^2} \quad (11a)$$

$$\rho = s_{ij}/\sigma_i \sigma_j \quad (11b)$$

Introducing changes of variables:

$$u = (x-\mu_i)/\sigma_i \text{ and } v = (y-\mu_j)/\sigma_j \quad (12)$$

Then the RHS of equation (10) becomes:

$$\frac{1}{2\pi\sqrt{1-\rho^2}} \int_{\frac{\tau_i-\mu_i}{\sigma_i}}^{\infty} \int_{\frac{\tau_j-\mu_j}{\sigma_j}}^{\infty} \exp\left(-\frac{1}{2(1-\rho^2)}(u^2 - 2\rho u v + v^2)\right) du\, dv \quad (13)$$

Let $c>0$ be defined by $$c^2 = 2(1-\rho^2) \quad (14)$$

and define:

$$\alpha_i = (\tau_i - \mu_i)/\sigma_i \text{ for all } i=1, \ldots, N \quad (15)$$

Then introduce new coordinates p and q by:

$$p = (x+y)/c\sqrt{2} \quad (16)$$

and finally define variables P and Q by:

$$P = \frac{a_i + a_j}{c\sqrt{2}} \text{ and } Q = \frac{a_j + a_i}{c\sqrt{2}} \quad (17)$$

The integral expression in equation (10) becomes:

$$\frac{\sqrt{1-\rho^2}}{\pi} \int_P^{\infty} e^{-p^2(1-\rho)} dp \int_{-p+Q+P}^{p+Q-P} e^{-q^2(1-\rho)} dq \quad (18)$$

The inner integral can be expressed in terms of the error function. The integral expression finally beocmes:

$$F(\rho) = \frac{\sqrt{1-\rho}}{2\sqrt{\pi}} \int_P^{\infty} e^{-p^2(1-\rho)} \big(erf(\sqrt{1+\rho}\,(Q+p+P)) - \\ erf(\sqrt{1+\rho}\,(Q-p+P))\big) dp \quad (19)$$

The equation to be solved therefore is;

$$F(\rho) = \Sigma_{ij} + \mu_i \mu_j \quad (20)$$

The equation (20) can be solved numerically, such as a modified secant method. From values of ρ, it is straightforward to obtain $s_{ij} = \rho \sigma_i \sigma_j$ as shown in equation (11bZ).

Figure 3:
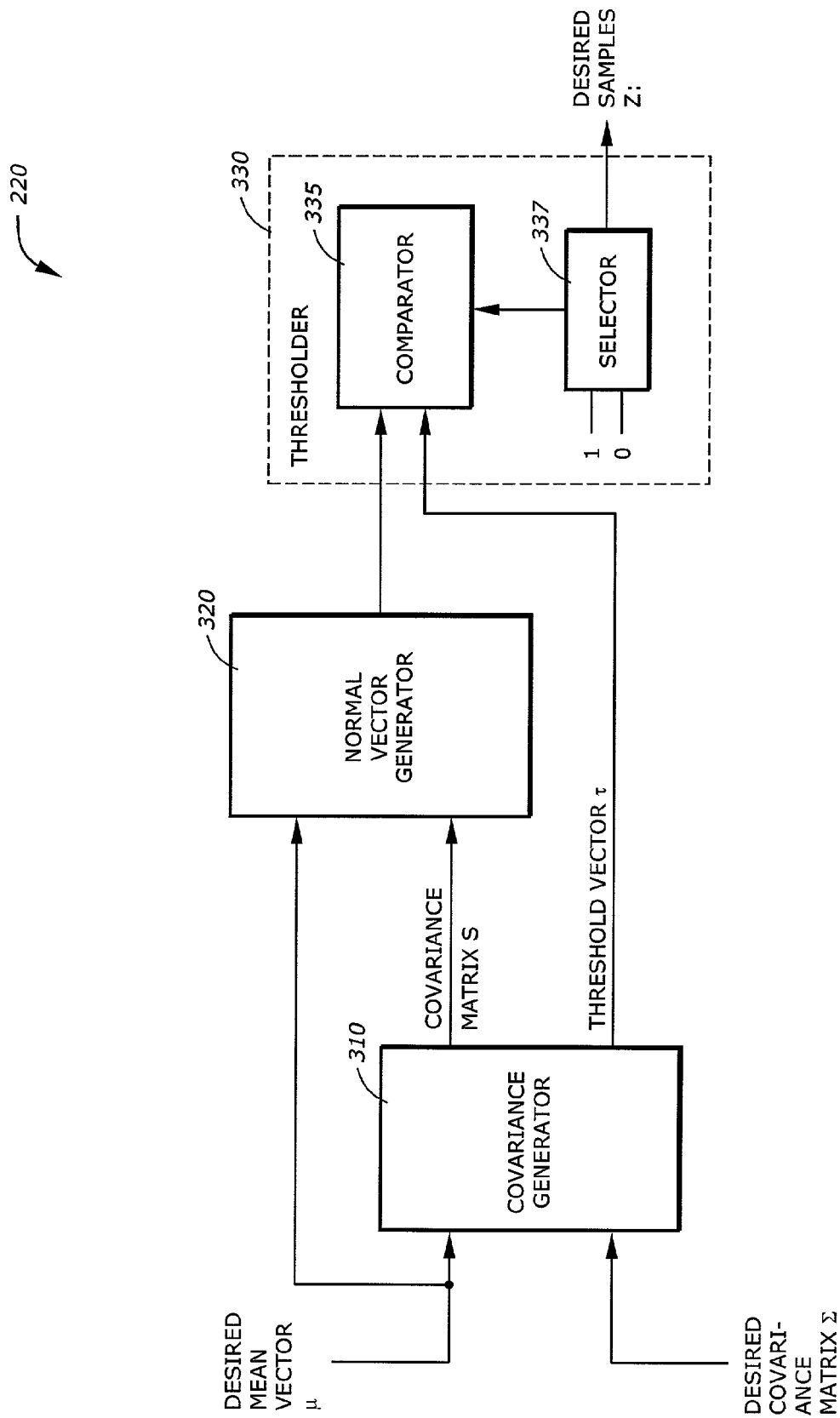
FIG. 3 is a diagram illustrating a random sampler shown in FIG. 2 according to one embodiment of the invention.

FIG. 3 is a diagram illustrating the random sampler 220 shown in FIG. 2 according to one embodiment of the invention. The random sampler 220 includes a covariance generator 310, a normal vector generator 320, and a thresholder 330.

The covariance generator 310 receives a desired mean vector $\mu = (\mu_1, \ldots, \mu_N)$ and a desired covariance matrix $\Sigma = (\Sigma_{ij})$ where $i=1, \ldots, N$ and $j=1, \ldots, N$. N is a positive integer and indicates the number of optical links in the network. The desired mean vector $\mu$ and the desired covariance matrix $\Sigma$ are the mean vector and covariance matrix of a multivariate Bernoulli distribution. Typically, the desired mean vector $\mu$ and the desired covariance matrix $\Sigma$ are specified as part of the simulation to study the reliability of the network. The covariance generator 310 generates a covariance matrix S and a threshold vector $\tau = (\tau_1, \ldots, \tau_N)$.

The normal vector generator 320 generates a normal vector $Y = (Y_1, \ldots, Y_N)$ based on the desired mean vector $\mu$ and the covariance matrix S. The normal vector Y has a multivariate Gaussian distribution having the mean vector equal to the desired mean vector and the covariance matrix equal to S.

The thresholder 330 applies the threshold vector τ to generate the desired samples Z based on the normal vector Y according to the threshold rule shown in equation (7). The desired samples z are samples of a Bernoulli distribution having a mean $\mu$ and a covariance matrix $\Sigma$.

Figure 4:
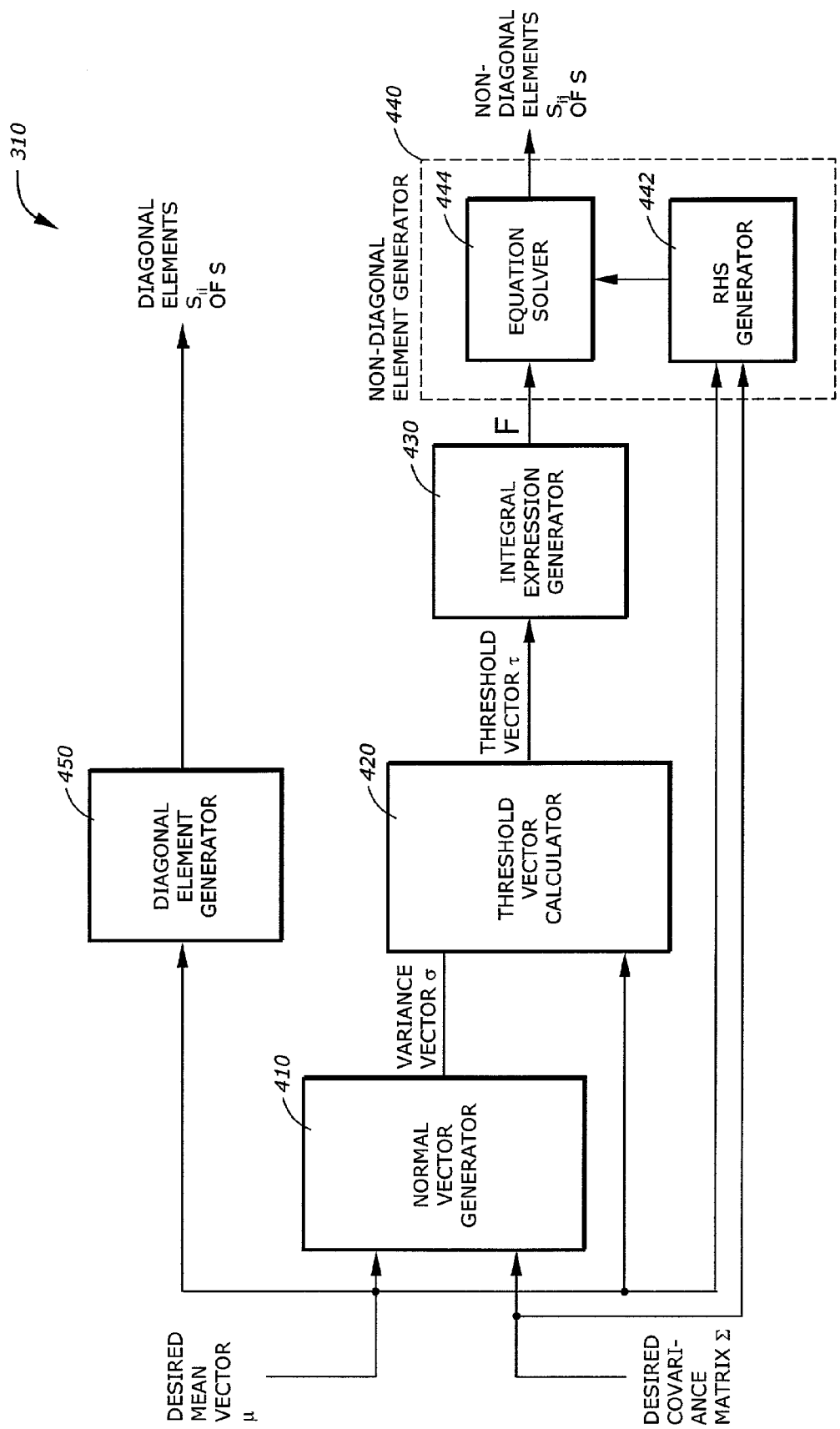
FIG. 4 is a diagram illustrating a covariance generator shown in FIG. 3 according to one embodiment of the invention.

FIG. 4 is a diagram illustrating the covariance generator 310 shown in FIG. 3 according to one embodiment of the invention. The covariance generator 310 includes a normal vector generator 410, a threshold vector calculator 420, an integral expression generator 430, a non-diagonal element generator 440, and a diagonal element generator 450.

The normal vector generator 410 generates a Gaussian distribution from the desired mean vector $\mu$ and the desired covariance matrix $\Sigma$. The normal vector generator 410 has N normal elements. Each of the normal elements at a vector index k having a mean $\mu_k$ and a variance $\sigma_k^2$. The mean $\mu_k$ is equal to a desired mean element of the desired mean vector $\mu$ at the vector index k.

The threshold vector calculator 420 calculates the threshold elements of the threshold vector $\tau = (\tau_1, \ldots, \tau_N)$ as follows:

$$\tau_i = \mu_i + \sigma_i\sqrt{2}\,\text{inverf}(1-2\mu_i) \quad (21)$$

where inverf is an inverse error function as shown in equation (6).

The integral expression generator 430 generates an integral expression F(ρ) using the threshold vector τ. The integral expression generator 430 forms the variables ρ, c, P, and Q as given in equations (11b), (14) and (17).

Note that P is the lower integral limit of the integral expression F(ρ). The upper integral limit is infinity. Then, the integral expression generator 430 generates the integral expression F(ρ) as shown in equation (19).

The non-diagonal element generator 440 obtains the first non-diagonal element $s_{ij}$ using the integral expression F(ρ), the means $\mu_i$ and $\mu_j$, and a desired non-diagonal element $\Sigma_{ij}$ of the desired covariance matrix. The non-diagonal element generator 440 includes a RHS generator 442 and an equation solver 444.

The RHS generator 442 generates the RHS of the equation for the integral expression provided by the integral expression generator 430. The RHS generator 442 receives the desired mean vector $\mu$ and the desired covariance matrix $\Sigma$ and calculates the RHS quantity $g_{ij}$ as:

$$g_{ij} = \Sigma_{ij} + \mu_i\mu_j \quad (22)$$

The equation solver 444 equates the integral expression F(ρ) with the RHS quantity $g_{ij}$ to form the equation:

$$F(\rho) = g_{ij} \quad (23)$$

In this equation, for given values of $\tau_i$, $\tau_j$, $\mu_i$, $\mu_j$, $\sigma_i$, and $\sigma_j$, the quantity ρ can be determined. Once ρ is determined, the non-diagonal element $s_{ij}$ can be derived directly. The integral equation (23) can be solved numerically by a number of techniques. In one embodiment, the integral equation (23) is solved by using a modified secant method as implemented in Mathematica's FindRoot function.

The diagonal element generator 450 computes the diagonal elements $s_{ij}$ of the covariance matrix S by equating $s_{ij}$ to the desired diagonal element $\Sigma_{ij} = \mu_j(1-\mu_j)$ of the desired covariance matrix $\Sigma$. The diagonal elements and the non-diagonal elements define the covariance matrix to be provided to the normal vector generator 320 as shown in FIG. 3.

Figure 5:
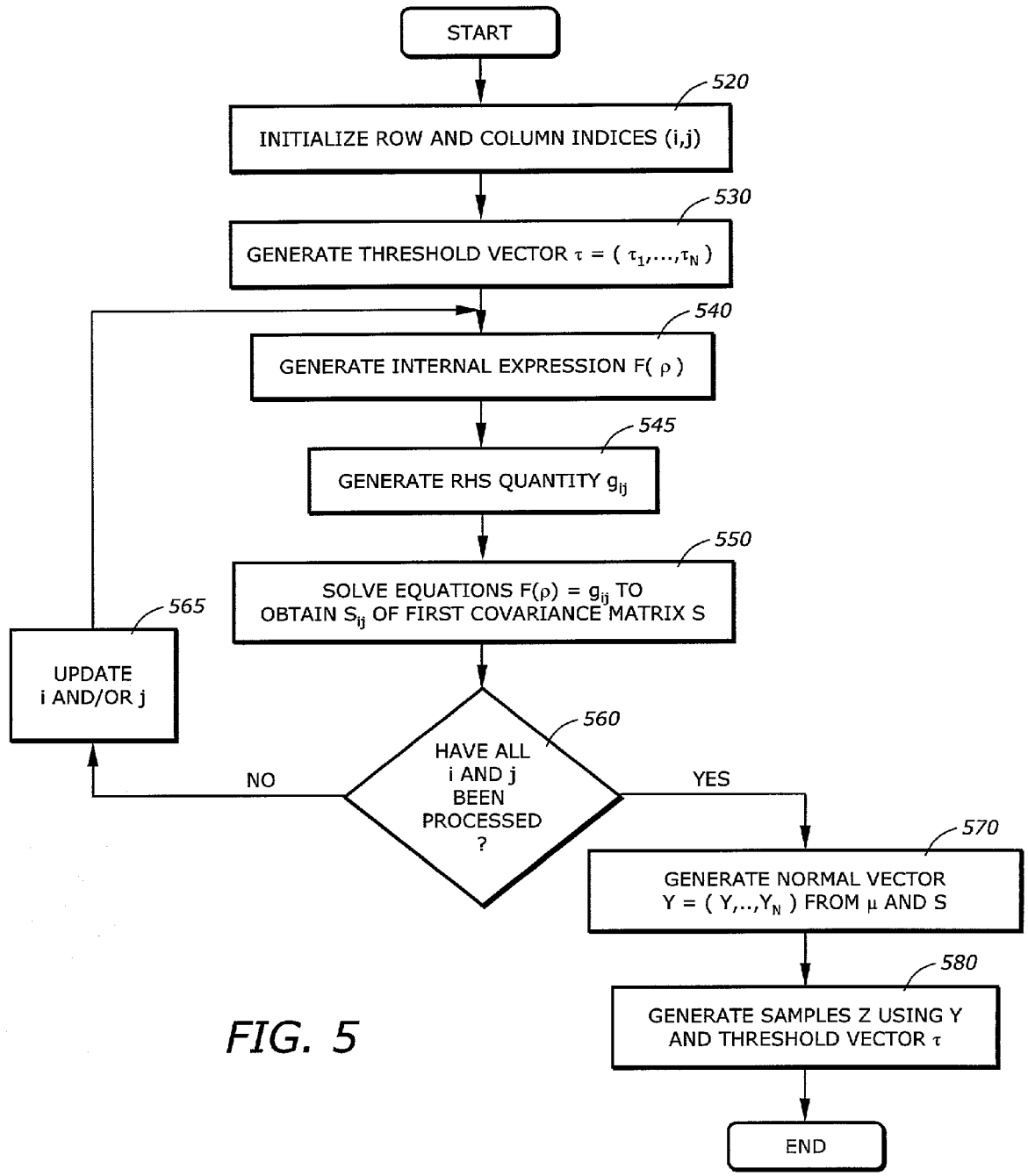
FIG. 5 is a flowchart illustrating a process to generate samples for a Bernoulli distribution according to one embodiment of the present invention.

FIG. 5 is a flowchart illustrating a process 500 to generate samples for a Bernoulli distribution according to one embodiment of the present invention.

Upon START, the process 500 initializes the row and column indices (i,j) for the covariance matrix (Block 250). Next, the process 500 generates the threshold vector $\tau=(\tau_1, \ldots, \tau_N)$ using equation (21) (Block 530). Next, the process 500 generates the integral expression F($\rho$) using the equation (19) (Block 540). Then, the process 500 generates the RHS quantity $g_{ij}$ using the equation (22) (Block 545). Next, the process 500 forms the integral equation and solve the integral equation for $\rho$ and obtains the elements $s_{ij}$ for the first covariance matrix (Block 550). In addition, the process 500 computes the diagonal elements $s_{ij}$ of the first covariance matrix.

Then, the process 500 determines if all elements at all row and column indices have been processed (Block 560). If not, the process 500 updates the row and/or column indices (Block 565) and goes to Block 540. Otherwise, the process 500 generates a normal vector $Y=(Y_1, \ldots, Y_N)$ from the desired mean vector $\mu$ and the first covariance matrix X (Block 570). Next, the process 500 calculates the sample Z by thresholding using the threshold vector $\tau$ (Block 580) and is then terminated.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   evaluating performance of a network having N optical links using a computer simulator, wherein evaluating the performance of the network includes generating random samples, comprising:
      generating a first covariance matrix from a desired mean vector and a desired covariance matrix of a Bernoulli distribution, wherein the desired mean vector includes N elements and the desired covariance matrix has a dimension N×N where N is the number of optical links of the network;
      constructing a normal vector using the desired mean vector and the first covariance matrix, wherein the normal vector includes N elements where N is the number of optical links of the network; and
      generating a sampling vector using the normal vector and a threshold vector, wherein the sampling vector includes N elements where N is the number of optical links of the network, the sampling vector having the desired mean vector and the desired covariance matrix.

2. The method of claim 1 wherein generating the first covariance matrix comprises:
   generating an integral expression F for a first non-diagonal element $s_{ij}$ of the first covariance matrix at a row index i and a column index j, the integral expression having an integral limit as function of threshold element $\tau_i$ and $\tau_j$ in the threshold vector at the vector indices i and j; and
   obtaining the first non-diagonal element $s_{ij}$ using the integral expression F, a mean $\mu_k$ of the desired mean vector, and a desired non-diagonal element $\Sigma_{ij}$ of the desired covariance matrix.

3. The method of claim 2 further comprising:
   obtaining a diagonal element $s_{jj}$ of the first covariance matrix at a first row index j and a first column index j using the mean $\mu_j$ at the vector index j, the diagonal element being equal to a desired diagonal element $\Sigma_{jj}$ of the desired covariance matrix.

4. The method of claim 3 further comprising:
   generating a threshold element $\tau_j$ of the threshold vector at a vector index j, the threshold element being equal to $\mu_j + \sigma_j\sqrt{2}\text{inverf}(1-2\mu_j)$ wherein $\mu_j$ and $\sigma_j$ are desired mean and variance, respectively, at the vector index j and inverf is an inverse error function.

5. The method of claim 2 wherein constructing the normal vector comprises:
   generating normal elements of the normal vector using the desired mean vector and the first covariance matrix.

6. The method of claim 5 wherein generating the sampling vector comprises:
   comparing a normal element $Y_k$ of the normal vector at a vector index k with a corresponding threshold element $\tau_k$ of the threshold vector at the vector index k;
   setting a sampling element of the sampling vector at the vector index k to a first value if the normal element $Y_k$ is greater than the corresponding threshold element $\tau_k$; and
   setting the sampling element of the sampling vector at the vector index k to a second value if the normal element $Y_k$ is equal to or less than the corresponding threshold element $\tau_k$.

7. The method of claim 2 wherein generating the integral expression F comprises:
   forming a first variable $\rho = s_{ij}/(\sigma_i\sigma_j)$;
   forming a second variable $c = \sqrt{2(1-\rho^2)}$;
   forming a third variable $P=(a_i+a_j)/(c\sqrt{2})$, P being one of the integral limits;
   forming a fourth variable $Q=(a_j-a_i)/(c\sqrt{2})$; and
   forming the integral expression $$F(\rho) = \frac{\sqrt{1-\rho}}{2\sqrt{\pi}} \int_P^\infty e^{-p^2(1-\rho)}\left(erf\left(\sqrt{1+\rho}\,(Q+p+P)\right) - erf\left(\sqrt{1+\rho}\,(Q-p+P)\right)\right)dp$$

wherein p is an integral variable, erf is an error function, $a_i$ and $a_j$ are respectively equal to $(\tau_i-\mu_j)/\sigma_i$ and $(\tau_j-\mu_j)/\sigma_j$, $\tau_i$ and $\tau_j$ being the threshold elements at the vector indices equal respectively to the row index i and the column index j, $\mu_i$ and $\mu_j$ being the means at the vector indices equal respectively to the row index i and the column index j, $\sigma_i$ and $\sigma_j$ being the variances at the vector indices equal respectively to the row index i and the column index j.

8. The method of claim 7 wherein obtaining the first non-diagonal element comprises:
   determining a right hand side (RHS) quantity $g_{ij} = \Sigma_{ij} + \mu_i\mu_j$;
   equating the integral expression to the RHS quantity to form an integral equation $F=g_{ij}$; and
   solving the integral equation for the first variable $\rho$.

9. The method of claim 8 wherein solving the integral equation comprises:
   solving the integral equation using a numerical method.

10. The method of claim 6 wherein the first value is 1 and the second value is 0.

11. An article of manufacture, comprising:
   a machine-readable medium including a plurality of instructions which when executed perform operations comprising:

evaluating performance of a network having N optical links, wherein evaluating the performance of the network includes generating random samples, comprising:

generating a first covariance matrix from a desired mean vector and a desired covariance matrix of a Bernoulli distribution, wherein the desired mean vector includes N elements and the desired covariance matrix has a dimension N×N where N is the number of optical links of the network;

constructing a normal vector using the desired mean vector and the first covariance matrix, wherein the normal vector includes N elements where N is the number of optical links of the network; and generating a sampling vector using the normal vector and a threshold vector, wherein the sampling vector includes N elements where N is the number of optical links of the network, the sampling vector having the desired mean vector and the desired covariance matrix.

12. The article of manufacture of claim 11 wherein generating the first covariance matrix comprises:

generating an integral expression F for a first non-diagonal element $s_{ij}$ of the first covariance matrix at a row index i and a column index j, the integral expression having an integral limit as function of threshold elements $\tau_i$ and $\tau_j$ in the threshold vector at the vector indices i and j; and obtaining the first non-diagonal element $s_{ij}$ using the integral expression F, a mean $\mu_k$ of the desired vector, and a desired non-diagonal element $\Sigma_{ij}$ of the desired covariance matrix.

13. The article of manufacture of claim 12 further comprising:

obtaining a diagonal element $s_{jj}$ of the first covariance matrix at a first row index j and a first column index j using the mean $\mu_j$ at the vector index j, the diagonal element being equal to a desired diagonal element $\Sigma_{jj}$ of the desired covariance matrix.

14. The article of manufacture of claim 13 further comprising:

generating a threshold element $\tau_j$ of the threshold vector at a vector index j, the threshold element being equal to $\mu_j+\sigma_j\sqrt{2}\mathrm{inverf}(1-2\mu_j)$ wherein $\mu_j$ and $\sigma_j$ are desired mean and variance, respectively, at the vector index j and inverf is an inverse error function.

15. The article of manufacture of claim 12 wherein constructing the normal vector comprises:

generating normal elements of the normal vector using the desired mean vector and the first covariance matrix.

16. The article of manufacture of claim 15 wherein generating the sampling vector comprises:

comparing a normal element $Y_k$ of the normal vector at a vector index k with a corresponding threshold element $\tau_k$ of the threshold vector at the vector index k;

setting a sampling element of the sampling vector at the vector index k to a first value if the normal element $Y_k$ is greater than the corresponding threshold element $\tau_k$; and setting the sampling element of the sampling vector at the vector index k to a second value if the normal element $Y_k$ is equal to or less than the corresponding threshold element $\tau_k$.

17. The article of manufacture of claim 12 wherein generating the integral expression F comprises:

forming a first variable $\rho=s_{ij}/(\sigma_i\sigma_j)$;

forming a second variable $c=\sqrt{2(1-\rho^2)}$;

forming a third variable $P=(a_i+a_j)/(c\sqrt{2})$, P being one of the integral limits;

forming a fourth variable $Q=(a_j-a_i)/(c\sqrt{2})$; and $$F(\rho) = \frac{\sqrt{1-\rho}}{2\sqrt{\pi}} \int_P^\infty e^{-p^2(1-\rho)}\big(erf(\sqrt{1+\rho}\,(Q+p+P)) - erf(\sqrt{1+\rho}\,(Q-p+P))\big)dp$$

wherein p is an integral variable, erf is an error function, $a_i$ and $a_j$ are respectively equal to $(\tau_i-\mu_i)/\sigma_i$ and $(\tau_j-\mu_j)/\sigma_j$, $\tau_i$ and $\tau_j$ being the threshold elements at the vector indices equal respectively to the row index i and the column index j, $\mu_i$ and $\mu_j$ being the means at the vector indices equal respectively to the row index i and the column index j, $\sigma_i$ and $\sigma_j$ being the variances at the vector indices equal respectively to the row index i and the column index j.

18. The article of manufacture of claim 17 wherein obtaining the first non-diagonal element comprises:

determining a right hand side (RHS) quantity $g_{ij}=\Sigma_{ij}+\mu_i\mu_j$;

equating the integral expression to the RHS quantity to form an integral equation $F=g_{ij}$; and solving the integral equation for the first variable $\rho$.

19. The article of manufacture of claim 18 wherein solving the integral equation comprises:

solving the integral equation using a numerical method.

20. The article of manufacture of claim 16 wherein the first value is 1 and the second value is 0.

21. A network simulator for evaluating performance of a network of free-space optical links, wherein the network simulator comprises:

a network modeler to model the network of free-space optical links;

a reliability modeler coupled to the network modeler to evaluate a reliability model for the network; and a random sampler coupled to the network modeler and the reliability modeler to generate random samples for a Bernoulli distribution, the random sampler comprising:

a covariance generator to generate a first covariance matrix from a desired mean vector and a desired covariance matrix of the Bernoulli distribution, a normal vector generator coupled to the covariance generator to construct a normal vector using the desired mean vector and the first covariance matrix, and a thresholder coupled to the covariance generator and the normal vector generator to generate a sampling vector using the normal vector and a threshold vector, the sampling vector having the desired mean vector and the desired covariance matrix.

22. The simulator of claim 21 wherein the covariance generator comprises:

an integral expression generator to generate an integral expression F for a first non-diagonal element $s_{ij}$ of the first covariance matrix at a row index i and a column index j, the integral expression having an integral limit as function of threshold elements $\tau_i$ and $\tau_j$ in the threshold vector at the vector indices i and j; and a non-diagonal element generator coupled to the integral expression generator to obtain the first non-diagonal element $s_{ij}$ using the integral expression F, a mean $\mu_k$ of the desired mean vector, and a desired non-diagonal element $\Sigma_{ij}$ of the desired covariance matrix.

23. The simulator of claim 22 wherein the random sampler further comprises:
a diagonal element generator to obtain a diagonal element $s_{ij}$ of the first covariance matrix at a first row index j and a first column index j using the mean $\mu_j$ at the vector index j, the diagonal element being equal to a desired diagonal element $\Sigma_{ij}$ of the desired covariance matrix.

24. The simulator of claim 23 wherein the random sampler further comprises:
a threshold vector calculator coupled to the first normal vector generator to generate a threshold element $\tau_j$ of the threshold vector at a vector index j, the threshold element being equal to $\mu_j+\sigma_j\sqrt{2}\text{inverf}(1-2\mu_j)$ wherein $\mu_j$ and $\sigma_j$ are the desired mean and variance, respectively, at the vector index j and inverf is an inverse error function.

25. The simulator of claim 22 wherein the normal vector generator generates normal elements of the normal vector using the desired mean vector and the first covariance matrix.

26. The simulator of claim 25 wherein the thresholder comprises:
a comparator to compare a normal element $Y_k$ of the normal vector at a vector index k with a corresponding threshold element $\tau_k$ of the threshold vector at the vector index k; and
a selector coupled to the comparator to set a sampling element of the sampling vector at the vector index k to a first value if the normal element $Y_k$ is greater than the corresponding threshold element $\tau_k$ and to set the sampling element of the sampling vector at the vector index k to a second value if the normal element $Y_k$ is equal to or less than the corresponding threshold element $\tau_k$.

27. The simulator of claim 22 wherein the integral expression generator generates the integral expression $$F(\rho) = \frac{\sqrt{1-\rho}}{2\sqrt{\pi}} \int_P^\infty e^{-p^2(1-\rho)}\bigl(\text{erf}(\sqrt{1+\rho}\,(Q+p+P)) - \text{erf}(\sqrt{1+\rho}\,(Q-p+P))\bigr)dp$$

wherein:
$\rho=s_{ij}/(\sigma_i\sigma_j)$, $c=\sqrt{2(1-\rho^2)}$, $P=(a_i+a_j)/(c\sqrt{2})$, P being one of the integral limits, $Q=(a_i-a_j)/(c\sqrt{2})$, p is an integral variable, erf is an error function, $a_i$ and $a_j$ are respectively equal to $(\tau_i-\mu_i)/\sigma_i$ and $(\tau_j-\mu_j)/\sigma_j$, $\tau_i$ and $\tau_j$ being the threshold elements at the vector indices equal respectively to the row index i and the column index j, $\mu_i$ and $\mu_j$ being the means at the vector indices equal respectively to the row index i and the column index j, $\sigma_i$ and $\sigma_j$ being the variances at the vector indices equal respectively to the row index i and the column index j.

28. The simulator of claim 27 wherein the non-diagonal element generator comprises:
a right hand side (RHS) generator to determines a right hand side (RHS) quantity $g_{ij}=\Sigma_{ij}+\mu_i\mu_j$;
an equation solver coupled to the integral expression generator and the RHS generator to equate the integral expression to the RHS quantity to form an integral equation $F=g_{ij}$, and to solve the integral equation for the first variable $\rho$.

29. The simulator of claim 28 wherein the equation solver solves the integral equation using a numerical method.

30. The simulator of claim 26 wherein the first values if 1 and the second value is 0.

31. A system comprises:
a processor; and
a memory coupled to the processor, the memory having program code to evaluate performance of a network having N optical links, the program code when executed by the processor causing the processor to:
generate random samples, comprising:
generate a first covariance matrix from a desired mean vector and a desired covariance matrix of a Bernoulli distribution, wherein the desired mean vector includes N elements and the desired covariance matrix has a dimension N×N where N is the number of optical links of the network,
construct a normal vector using the desired mean vector and the first covariance matrix, wherein the normal vector includes N elements where N is the number of optical links of the network, and
generate a sampling vector using the normal vector and a threshold vector, wherein the sampling vector includes N elements where N is the number of optical links of the network, the sampling vector having the desired mean vector and the desired covariance matrix.

32. The system of claim 31 wherein the program code causing the processor to generate the first covariance matrix causes the processor to:
generate an integral expression F for a first non-diagonal element $s_{ij}$ of the first covariance matrix at a row index i and a column index j, the integral expression having an integral limit as function of threshold elements $\tau_i$ and $\tau_j$ in the threshold vector at the vector indices i and j; and
obtain the first non-diagonal element $s_{ij}$ using the integral expression F, a mean $\mu_k$ of the desired mean vector, and a desired non-diagonal element $\Sigma_{ij}$ of the desired covariance matrix.

33. The system of claim 32 wherein the program code, when executed, further causing the processor to:
obtain a diagonal element $s_{ij}$ of the first covariance matrix at a first row index j and a first column index j using the mean $\mu_j$ at the vector index j, the diagonal element being equal to a desired diagonal element $\Sigma_{ij}$ of the desired covariance matrix.

34. The system of claim 33 wherein the program code, when executed, further causing the processor to:
generate a threshold element $\tau_j$ of the threshold vector at a vector index j, the threshold element being equal to $\mu_j+\sigma_j\sqrt{2}\text{inverf}(1-2\mu_j)$ wherein $\mu_j$ and $\sigma_j$ are desired mean and variance, respectively, at the vector index j and inverf is an inverse error function.

35. The system of claim 32 wherein the program code causing the processor to construct the normal vector causes the processor to:
generate normal elements of the normal vector using the desired mean vector and the first covariance matrix.

36. The system of claim 35 wherein the program code causing the processor to generate the sampling vector causes the processor to:
compare a normal element $Y_k$ of the normal vector at a vector index k with a corresponding threshold element $\tau_k$ of the threshold vector at the vector index k;

set a sampling element of the sampling vector at the vector index k to a first value if the normal element $Y_k$ is greater than the corresponding threshold element $\tau_k$; and set the sampling element of the sampling vector at the vector index k to a second value if the normal element $Y_k$ is equal to or less than the corresponding threshold element $\tau_k$.

37. The system of claim 32 wherein the program code causing the processor to generate the integral expression F causes the processor to:

form a first variable $\rho = s_{ij}/(\sigma_i \sigma_j)$;

form a second variable $c = \sqrt{2(1-\rho^2)}$;

form a third variable $P = (a_i + a_j)/(c\sqrt{2})$, P being one of the integral limits;

form a fourth variable $Q = (a_j - a_j)/(c\sqrt{2})$; and form the integral expression $$F(\rho) = \frac{\sqrt{1-\rho}}{2\sqrt{\pi}} \int_P^\infty e^{-p^2(1-\rho)} \left( erf\left(\sqrt{1+\rho}\,(Q+p+P)\right) - erf\left(\sqrt{1+\rho}\,(Q-p+P)\right) \right) dp$$

wherein $\rho$ is an integral variable, erf is an error function, $a_i$ and $a_j$ are respectively equal to $(\tau_i - \mu_i)/\sigma_i$ and $(\tau_j - \mu_j)/\sigma_j$, $\tau_i$ and $\tau_j$ being the threshold elements at the vector indices equal respectively to the row index i and the column index j, $\mu_i$ and $\mu_j$ being the means at the vector indices equal respectively to the row index i and the column index j, $\sigma_i$ and $\sigma_j$ being the variances at the vector indices equal respectively to the row index i and the column index j.

38. The system of claim 32 wherein the program code causing the processor to obtain the first non-diagonal element causes the processor to:

determine a right hand side (RHS) quantity $g_{ij} = \Sigma_{ij} + \mu_i \mu_j$;

equate the integral expression to the RHS quantity to form an integral equatin $F = g_{ij}$; and solve the integral equation for the first variable $\rho$.

39. The system of claim 38 wherein the program code causing the processor to solve the integral equation causes the processor to:

solve the integral equation using a numerical method.

40. The system of claim 36 wherein the first value is 1 and the second value is 0.

* * * * *

UNITED STATES PATENT AND TRADEMARK OFFICE
CERTIFICATE OF CORRECTION

PATENT NO.         : 7,006,954 B1
APPLICATION NO. : 10/077343
DATED                : February 28, 2006
INVENTOR(S)        : Curtis et al.

It is certified that error appears in the above-identified patent and that said Letters Patent is hereby corrected as shown below:

In Claim #17, Line #7, please delete "$(a_j-a_j)$" and insert -- $(a_j-a_i)$ --.

In Claim #17, Line #7, after "and" please insert -- forming the integral expression --.

In Claim #17, Line #11, please delete "$(\tau_j-\mu_j)$" and insert -- $(\tau_j-\mu_j)$ --.

In Claim #23, Line #4, please delete "$S_{ij}$" and insert -- $S_{jj}$ --.

In Claim #23, Line #7, please "$\Sigma_{ij}$" and insert -- $\Sigma_{jj}$ --.

In Claim #27, Line #7, please delete "$a_j-a_j$" and insert -- $a_j-a_i$ --.

In Claim #27, Line #9, please delete "$(\tau_i-\mu_j)$" and insert -- $(\tau_i-\mu_i)$ --.

In Claim #30, Line #1, please delete "values" and insert -- value --.

In Claim #33, Line #3, please delete "$S_{ij}$" and insert -- $S_{jj}$ --.

In Claim #33, Line #6, please delete "$\Sigma_{ij}$" and insert -- $\Sigma_{jj}$ --.

In Claim #37, Line #8, please delete "$(a_j-a_j)$" and insert -- $(a_j-a_i)$ --.

In Claim #38, Line #6, please delete "equatin" and insert -- equation --.

Signed and Sealed this

Twenty-sixth Day of September, 2006

JON W. DUDAS
*Director of the United States Patent and Trademark Office*